(12) United States Patent
Lorenz et al.

(10) Patent No.: US 6,454,409 B1
(45) Date of Patent: Sep. 24, 2002

(54) CONTACT LENSES

(75) Inventors: Kathrine Osborn Lorenz, N. Jacksonville Beach; Timothy A. Clutterbuck, Jacksonville; Brian S. Armitage, Jacksonville Beach; Susan B. Orr, Jacksonville, all of FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 09/639,629

(22) Filed: Aug. 15, 2000

(51) Int. Cl.[7] .............................. G02C 7/04; G02C 7/02
(52) U.S. Cl. .............................. 351/160 H; 351/160 R; 351/177
(58) Field of Search .................... 351/160 R, 160 H, 351/161–162, 174, 177

(56) References Cited

U.S. PATENT DOCUMENTS

| | | | | |
|---|---|---|---|---|
| 4,165,158 A | | 8/1979 | Travnicek | 351/160 H |
| 4,239,353 A | * | 12/1980 | Koller | 351/160 H |
| 4,463,148 A | | 7/1984 | Hofer et al. | 526/264 |
| 4,561,737 A | | 12/1985 | Bourset et al. | 351/160 R |
| 5,069,542 A | * | 12/1991 | Hofer et al. | 351/160 H |
| 5,452,031 A | * | 9/1995 | Ducharme | 351/177 |
| 5,483,304 A | * | 1/1996 | Porat | 351/161 |

OTHER PUBLICATIONS

Merriam Webster's Colleguate Dictionary (10th ed 1997), p. 109.

Harodl A. Stein, Bernard J. Slatt, and Raymond M. Stein, Ophthalmic Terminology:Speller and Vocabulary Builder (3d ed 1992), p. 103.

Graeme Young, Soft Lens Fitting Reassessed, Spectrum 1992 pp. 56, 57, 60, 61.

Malcolm M. Bibby & Alan Tomlinson, A Model to Explain the Effect of Soft Lens Design Specifications on Movement, American Journal of Optometry & Physiological Optics, Apr. 1983, vol. 60, No. 4, pp. 287–291.

Nathan Efron and Jan Veys, Defects in Disposable Contact Lenses Can Comprise Ocular Integrity, International Contact Lens Clinic, Jan. Feb. 1992, vol. 19 No. 1&2, pp. 8–18.

Graeme Young et al., Influence of Softcontact Lens Design on Clinical Performance, Optometry & Vision Science, vol. 70, No. 5, pp. 394–403, 1993.

Mark J. Roseman, Effects of Base Curve on the Fit of Thin, Mid–Water Contact Lenses, International Contact Lens Clinic, vol. 20, May/Jun. 1993, pp. 95–101.

Gerald E. Lowther et al., Critical Base Curve and Diameter Interval in the Fitting of Spherical Soft Contact Lenses, American Journal of Optometry & Physiological Optics, May 1981, vol. 58, No. 5, pp. 355–360.

Malcolm M. Bibby, Sagittal Depth Considerations in the Selection of the Base Curve Radius of a Soft Contact Lens, American Journal of Optometry & Physiological Optics, Jul. 1979, vol. 56, No. 7, pp. 407–413.

\* cited by examiner

Primary Examiner—Jordan M. Schwartz
(74) Attorney, Agent, or Firm—Lois Gianneschi

(57) ABSTRACT

Contact lenses that have a back edge designed so that the flat portion of the edge does not rest on the wearer's conjunctiva are provided. The lenses of the invention exhibit good lens handling as well as excellent on-eye comfort and movement.

12 Claims, 2 Drawing Sheets

CONTACT LENSES

FIELD OF THE INVENTION

The invention relates to contact lenses. In particular, the invention relates to contact lenses that have a back edge designed so that the flat portion of the edge does not rest on the wearer's conjunctiva. The lenses of the invention exhibit good lens handling as well as excellent on-eye comfort and movement.

BACKGROUND OF THE INVENTION

The use of contact lenses for cosmetic effect and the correction of visual acuity is well known. One disadvantage of contact lenses is that they are subject to debris accumulation while in use. Debris removal, in part, is facilitated if the lens moves easily on the eye because such movement allows tear fluid to remove debris from under the lens. However, the design of the back surface edges of most conventional contact lenses is flat, hindering movement of the lens on the eye. Additionally, the back surface edge of these conventional lenses may form a sharp edge that impinges on the conjuctival membrane, indenting and roughening the membrane.

One lens design, disclosed in U.S. application Ser. No. 09/277,464 incorporated herein in its entirety by reference, permits tear movement, debris removal, and does not impinge on the conjunctival membrane. Such a lens design, an edge-off-eye design, is depicted in FIG. 1 in a magnified, cross-sectional view that incorporates a fillet and edge flat. By "fillet" is meant a rounded junction between the back curve of the concave surface and the edge flat that is tangential to the back curve and edge flat. By "edge flat" is meant a flattened area connecting the back with the front surface of the lens.

Referring to FIG. 1, back surface 1 incorporates fillet 2 and edge flat 3 at its periphery to produce an edge-off-eye lens edge. This edge design permits lifting of the edge apex off of the ocular surface facilitating movement of the lens on the eye. Also, the shape of fillet 2 is such that is will not irritate the eye's surface. The use of an edge flat 3 also truncates the lens edge, eliminating any sharpness from the lens edge.

Although the edge-off-eye design represents an improvement compared to conventional lens designs, problems with conjunctival indentations, and less than desirable on-eye movement can occur with edge-off-eye lenses. Thus, a need exists for an improved edge-off-eye lens.

DETAILED DESCRIPTION OF THE INVENTION AND PREFERRED EMBODIMENTS

The invention provides contact lenses and methods for producing contact lenses, in which an edge-off-eye lens design is incorporated. The lenses of the invention represent an improvement over prior edge-off-eye designs in that the lenses of the invention exhibit good handling as well as superior comfort and on-eye movement.

In one embodiment, the invention provides a contact lens comprising, consisting essentially of, and consisting of a convex surface, a concave surface comprising, consisting essentially of, and consisting of a fillet and an edge flat, and one or more features selected from the group consisting of an apex height of about 16 to about 25 $\mu$m, a mid-peripheral area maximum thickness of about 180 to about 300 $\mu$m, a bevel width of greater than about 0.8 mm to about 2.5 mm, and an edge height of about 0.02 mm to about 0.08 mm.

Figure 1:
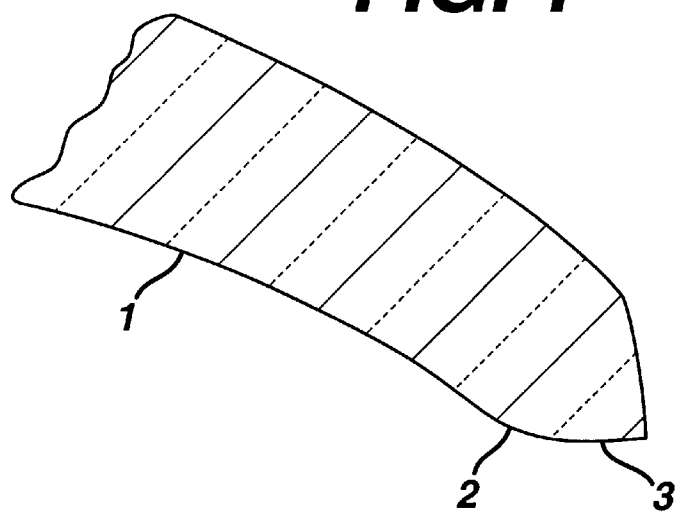
FIG. 1 is a magnified, cross-sectional view of a portion of an edge-off-eye lens.
Figure 2:
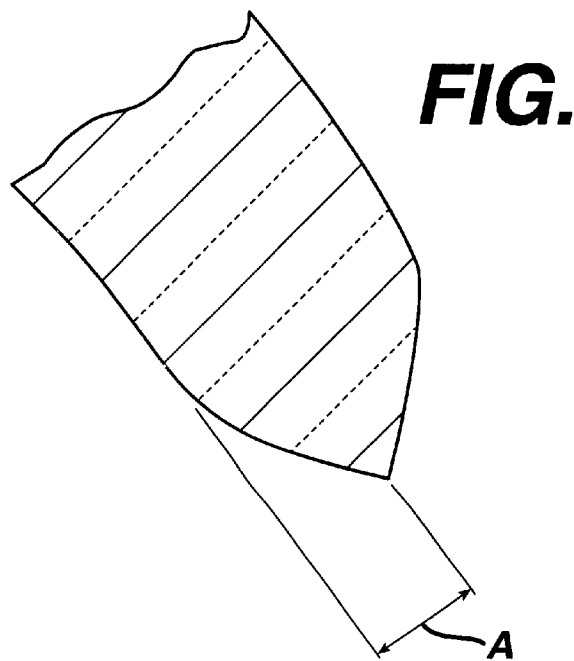
FIG. 2 is a magnified, cross-sectional view of a portion of an edge-off-eye lens.
Figure 3:
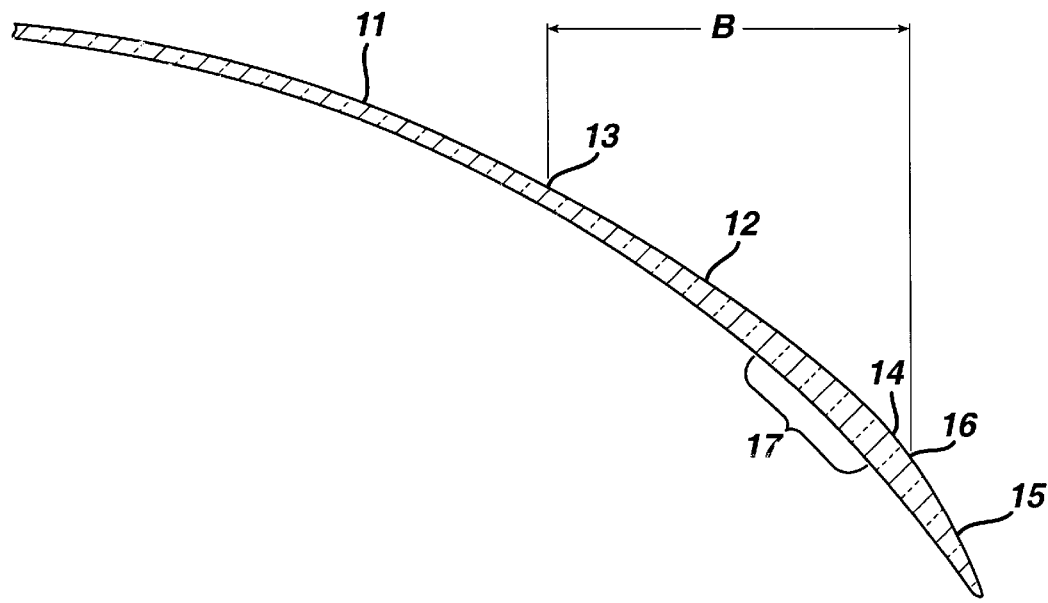
FIG. 3 is a magnified, cross-sectional view of a portion of an edge-off-eye lens.
Figure 4:
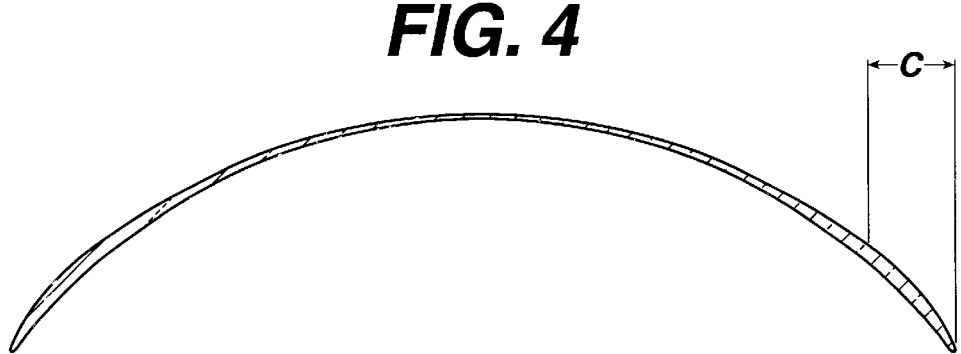
FIG. 4 is a magnified, cross-sectional view of an edge-off eye lens.
Figure 4A:
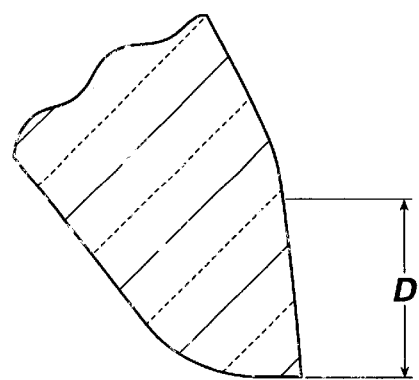
FIG. 4a is a magnified, cross-sectional view of the edge of the lens of FIG. 4.

By "apex height" is meant the vertical distance between the corneal surface and the lens edge apex. Referring to FIG. 2, apex height A is shown. By "mid-peripheral area" is meant the area of the lens between the optical-lenticular zone junction and the bevel-chamfer junction. Referring to FIG. 3, mid-peripheral area B is shown between the junction 13 of optical zone 11 and lenticular zone 12 and the junction 16 of bevel 14 and chamfer 15. By "bevel width" is meant the distance between the lens edge, or outermost point of the lens, and the junction between the lenticular zone and the lens bevel. Referring to FIG. 4, bevel width C is shown. By "edge height" is meant the distance between the front and back surfaces of the lens at the outermost periphery of the lens. In FIG. 4a is shown an edge height D for a lens.

It is one discovery of the invention that as the apex height decreases, lens movement decreases. Thus, it is desirable to maintain an apex height in an edge-off-eye lens edge that is sufficient to provide an amount of lens movement that permits the lens to move easily with blinking. Preferably, the apex height is about 16 to about 25 $\mu$m.

It is another discovery of the invention that mid-peripheral area maximum thickness affects both lens handling and on-eye movement and comfort. More specifically, too great an amount of thickness results in a reduction of on-eye comfort, yet too little thickness reduces ease of lens handling. By selecting a maximum thickness of about 180 to about 300 $\mu$m, a balance between comfort and handling may be obtained. The thickness of the mid-peripheral area is measured at along a normal to the curvature of the back and front surfaces of the lens. The maximum thickness of the mid-peripheral area generally will occur in the region 17 shown in FIG. 3. Preferably, one or more of the maximum thicknesses set forth on Table 1 are used.

TABLE 1*

| Distance** | Thickness | More Preferred |
| --- | --- | --- |
| 1.6 mm to edge | 210 to 300 $\mu$m | 235 $\mu$m |
| 1.2 mm to edge | 205 to 235 $\mu$m | 225 $\mu$m |
| 0.8 mm to edge | 180 to 200 $\mu$m | 190 $\mu$m |

*The values of Table 1 are to be taken to be proceeded by the term "about."
**"Distance" means the distance from the edge apex measured with the lens substantially flat.

More preferably, the mid-peripheral area maximum thicknesses are used in combination within the mid-peripheral area.

In lenses of the invention in which a mono-curve design is used in addition to the edge-off-eye design, sagittal depth also may be a consideration in designing the lenses. This ability to use an increased sagittal depths is desirable because a higher depth aids in centration of the lens on the eye.

One ordinarily skilled in the art will recognize that with contact lens wear, especially extended wear, the lens edge may press into the conjunctiva causing an indentation. This indentation can occur even with the use of edge-off-eye lenses. It is believed that such indentations are indicative of a tight fitting lens with unacceptable movement.

It is yet another discovery of the invention that conjunctival indentations may be avoided by selection of certain bevel widths, edge heights, or combinations thereof Preferably, a bevel width of greater than about 0.8 mm to about 2.5 mm is used alone or in combination with an edge height of about 0.02 mm to about 0.08 mm.

The back and front curves of the contact lenses of the invention may be of any configuration desired. For example, the surfaces may have any one or more of spheric, aspheric, bifocal, multifocal, multifocal-toric, prismatic, cylindric corrections, and combinations thereof. These corrections may be on either or both the convex or concave surface.

In the lenses of the invention, preferably the fillet is rounded and has a radius of curvature of about 25 to about 500, preferably about 25 to about 250, more preferably about 50 to about 100 $\mu$m. The length of the fillet is about 15 to about 350, preferably about 15 to 100, more preferably about 20 to 50 $\mu$m. The edge flat length is about 10 to about 250, preferably about 10 to 125 $\mu$m, more preferably about 15 to 50 $\mu$m.

Contact lenses useful in the invention preferably are soft lenses made of any material suitable for producing such lenses. The lenses of the invention may have any of a variety of corrective optical characteristics incorporated onto the surfaces. For example, the lens of the invention is a toric soft contact lens, meaning that the contact has a cylindrical optical surface, or power, to correct for the wearer's astigmatism.

The concave surfaces of the lenses of the invention may be formed by any convenient means. For example, an optical cutting tool with a numerically controlled lathe may be used to form a metallic optical tool. The tool is then used to make convex and concave surface molds that are then used to form the lens of the invention using a suitable liquid resin placed between the molds followed by compression and curing of the resin.

The invention will be clarified by the following, non-limiting examples.

EXAMPLES

Example 1

On-eye lens movement was measured using 30 each of two soft contact lenses A and B having an edge-off-eye design and apex heights of 16 $\mu$m and 37 $\mu$m, respectively. Lens B additionally differed from lens A in that lens B was 10 microns thicker than lens A 1.2 mm from the edge and lens B was 15 microns thicker than A 0.2 mm from the edge. These differences in thickness were not thought sufficient to affect lens movement. The results of lens movement in up-gaze at 30 min is shown on Table 2. Lens movement was measured by observing the lens on the patient's eye.

TABLE 2

| Frequency Distribution | Excessive (+2) | Moderate (+1) | Optimal (0) | Minimal (-1) | Insufficient (-2) |
|---|---|---|---|---|---|
| Lens A | 0% | 10% | 73.3% | 16.7% | 0% |
| Lens B | 0% | 26.7% | 63.3% | 10% | 0% |

The results demonstrate that lens B moved more that lens A, which difference in movement is attributable to the difference in apex height.

Example 2

A 6 hour dispensing study of soft contact lenses having an edge-off-eye design was conducted with 34 each of lenses C and D having apex heights of 26 and 37 $\mu$m, respectively. Lens D was thicker than lens C by 30 microns at 0.2 mm from the lens edge. As shown by the results on Tables 3 and 4, the on-eye movement of the lens with the lesser apex height is equal to that of the other lens both at 30 min and at 6 h, respectively. The results demonstrate that lenses with apex heights of 37 and 26 $\mu$m exhibit similar amounts of movement.

TABLE 3

| Frequency Distribution | Excessive (+2) | Moderate (+1) | Optimal (0) | Minimal (-1) | Insufficient (-2) |
|---|---|---|---|---|---|
| Lens C | 0% | 4.4% | 61.8% | 33.8% | 0% |
| Lens D | 0% | 5.9% | 70.6% | 23.5% | 0% |

TABLE 4

| Frequency Distribution | Excessive (+2) | Moderate (+1) | Optimal (0) | Minimal (-1) | Insufficient (-2) |
|---|---|---|---|---|---|
| Lens C | 0% | 0.0% | 55.9% | 41.2% | 2.9% |
| Lens D | 0% | 4.4% | 50.0% | 39.7% | 5.9% |

Example 3

Four soft contact lenses incorporating the edge-off-eye design and bevel widths and edge heights as set forth on Table 5 were tested in two masked, overnight, contra-lateral studies comparing 31 each of lens E against lens F and 31 each of lens G against lens H. The results are set forth on Table 6 demonstrate that improvement in conjunctival indentation was seen with changes in bevel width and edge height.

TABLE 5

|  | Lens E | Lens F | Lens G | Lens H |
|---|---|---|---|---|
| Bevel Width (mm) | 0.8 | 1.2 | 1.2 | 1.2 |
| Edge Height (mm) | 0.080 | 0.050 | 0.050 | 0.050 |
| Back Surface Peripheral Radius (mm) | NA | 9.00 | NA | 9.00 |
| Apex Height ($\mu$m) | 35 | 33 | 27 | 23 |

TABLE 6

|  | Median (Range) | Mode | Absent | Slight | Mild | Moderate | Severe |
|---|---|---|---|---|---|---|---|
| Lens E | 3.0 (1.0–4.0) | 4.0 | 0% | 10% | 23% | 10% | 48% |
| Lens F | 2.0 (0.0–4.0) | 2.0 | 23% | 23% | 36% | 13% | 7% |
| Lens G | 1.0 (0.0–4.0) | 1.0 | 16% | 45% | 32% | 3% | 3% |
| Lens H | 10 (0.0–4.0) | 00 | 39% | 23% | 23% | 16% | 0% |

What is claimed is:

1. A contact lens comprising a convex surface, a concave surface, an optical zone and a lenticular zone having a first junction therebetween, a bevel and a chamfer having a second junction therebetween, a third junction between the bevel and lenticular zone, a fillet, an edge flat, and one or more features selected from the group consisting of an apex height of about 16 to about 25 μm, a mid-peripheral area maximum thickness of about 180 to about 300 μm, and a bevel width of greater than about 0.8 mm to about 2.5 mm.

2. The lens of claim 1, wherein the feature is the apex height of about 16 to about 25 μm.

3. The lens of claim 1, wherein the feature is the mid-peripheral area maximum thickness of about 180 to about 300 μm.

4. The lens of claim 1, wherein the feature is the bevel width of greater than about 0.8 mm to about 2.5 mm.

5. The lens of claim 1, wherein each of the convex and concave surfaces comprise one or more of spheric, aspheric, bifocal, multifocal, multifocal-toric, prismatic, cylindric corrections, and combinations thereof.

6. The lens of claim 1, wherein the lens is a soft contact lens.

7. A soft contact lens comprising a convex surface, a concave surface, an optical zone and a lenticular zone having a first junction therebetween, a bevel and a chamfer having a second junction therebetween, a third junction between the bevel and lenticular zone, a fillet, an edge flat, an apex height of about 16 to about 25 μm, a mid-peripheral area maximum thickness of about 180 to about 300 μm, and a bevel width of greater than about 0.8 mm to about 2.5 mm.

8. The lens of claim 7, wherein each of the convex and concave surfaces comprise one or more of spheric, aspheric, bifocal, multifocal, multifocal-toric, prismatic, cylindric corrections, and combinations thereof.

9. A method for manufacturing a contact lens comprising the step of: providing contact lens comprising a convex surface, a concave surface, an optical zone and a lenticular zone having a first junction therebetween, a bevel and a chamfer having a second junction therebetween, a third junction between the bevel and lenticular zone, a fillet, an edge flat, and one or more features selected from the group consisting of an apex height of about 16 to about 25 μm, a mid-peripheral area maximum thickness of about 180 to about 300 μm, and a bevel width of greater than about 0.8 mm to about 2.5 mm.

10. The method of claim 9, wherein the feature is the apex height of about 16 to about 25 μm.

11. The method of claim 9, wherein the feature is the mid-peripheral area maximum thickness of about 180 to about 300 μm.

12. The method of claim 9, wherein the feature is the bevel width greater than about 0.8 mm to about 2.5 mm.

* * * * *